Figure 1:
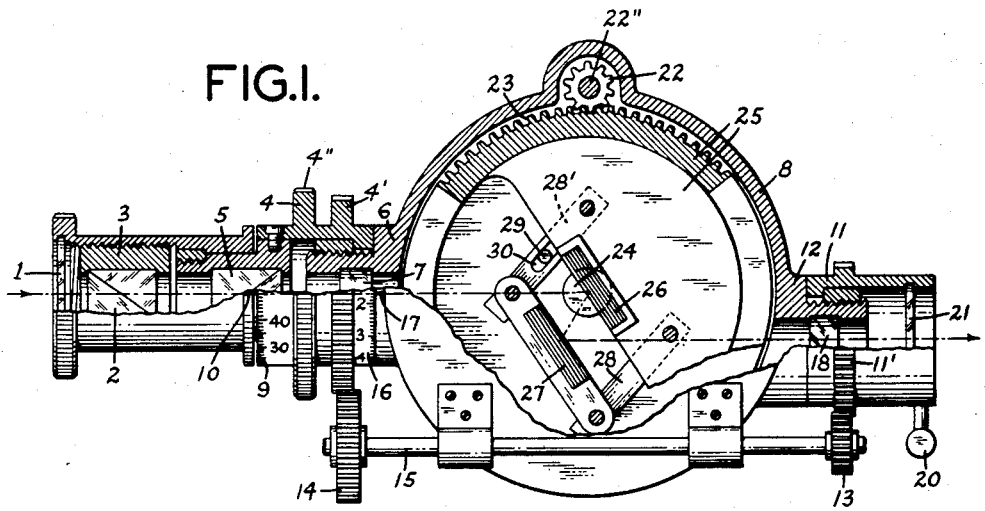

Sept. 15, 1953  S. RÖSCH  2,651,971
INSTRUMENT FOR PRODUCING COLORS BY MEANS OF POLARIZATION
Filed July 18, 1950

INVENTOR.
SIEGFRIED RÖSCH
BY
ATTORNEY.

Patented Sept. 15, 1953

2,651,971

UNITED STATES PATENT OFFICE 2,651,971

INSTRUMENT FOR PRODUCING COLORS BY MEANS OF POLARIZATION

Siegfried Rösch, Wetzlar, Germany, assignor to Ernst Leitz, G. m. b. H., Wetzlar, Germany, a German corporation Application July 18, 1950, Serial No. 174,389
In Germany August 29, 1949

8 Claims. (Cl. 88—65)

This invention relates to an instrument for producing predetermined colors and more particularly, to an instrument for producing said colors by polarization.

It is known to arrange optically anisotropic elements, for instance, optically rotating crystals between two polarizers to produce interference colors. The hues of said interference colors can be varied by rotating one of the polarizers. Colors produced in this manner are used in color measuring instruments. (L. Arons Ein Chromoskop—A Chromoscope Ann. Phys. (4), 33 (1910), 799–832.) Such colors however, form a sequence which it is impossible to recognize clearly, for, when using one set of optically rotating crystals, such as quartz plates, the same color can be produced in different ways. Therefore, E. Buchwald (Metrik Kristalloptischer Interferenzfarben—Measurement of Crystal Optically Produced Interference Colors Ann. Phys. (5) 38, 1940, 245–260) has developed a method whereby the colors produced can be investigated systematically. In order to increase saturation of the colors, L. Arons has constructed the so-called "compound chromoscope" by adding a further quartz plate and a further polarizer to the above described instrument (Ann. Phys. (4) 39, 1912, 545–568). When using such an instrument, hue and brilliance of the colors produced can be adjusted quite satisfactorily by manipulating the two polarizers, while saturation can be varied only intermittently.

In accordance with this invention, a predetermined color may be produced, and the degree of saturation of the color may be varied continuously by using an instrument in which the quartz plates are of the same thickness and one of the polarizers is a reflective polarizer.

A further object of this invention consists in providing a suitable reflective polarizer. The simplest form of such a polarizer is a plain glass plate capable of reflecting the pencil of rays, whereby variable amounts of white light may be admixed by moving the plate out of the position of the angle of polarization.

Still another object of this invention consists in avoiding bending of the whole instrument in connection with the above mentioned movement of the plate. This is accomplished by providing a pair of such reflective polarizers and arranging them in such a manner that they are capable of always moving parallel to each other. This arrangement causes the pencil of rays to continue to proceed in its former direction after having been reflected twice.

A further object of this invention consists in providing reflective polarizers of special structure in order to maintain high and uniform intensity of light within a larger range of movement of said reflective polarizer plates. An especially effective means of accomplishing this, consists in composing each reflective polarizer of five polished parallel-faced plates of glass of medium refractive power. One may use of course, a smaller number of plates, especially if they are provided with a partly transparent mirror coating.

Another object of this invention is an improvement of the known double chromoscope in which there is interposed at the place of entry of the light, a further polarizer for regulating the brilliance of light while at the place of its exit, a second quartz plate with a polarizer is added. The polarizer arranged in the middle of said known chromoscope, consists according to this invention, of a set of glass plates.

A further object of this invention consists in providing means to guide into the field of vision of the eye lens another comparison pencil of rays. Means of this kind are described and illustrated by the drawings shown in the above mentioned publication Ann. Phys. (4), 39, 1912, 545–568.

A further object of this invention consists in arranging one after the other, two or more systems of the kind described above in order to increase to a maximum saturation of the colors produced.

Figure 2:
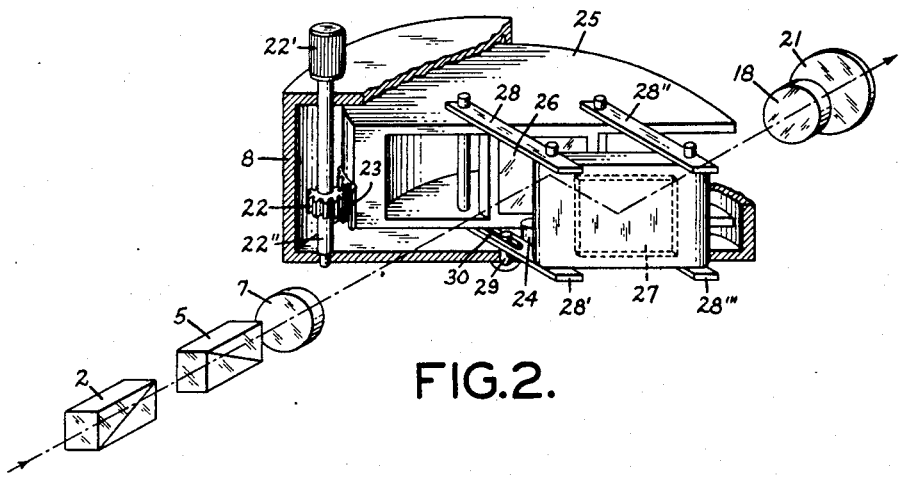

The above and other features and objects of this invention will become more apparent from the following description of an especially suitable embodiment thereof, reference being had to the accompanying drawings, which are given merely as an illustration and not as a limitation upon the scope of the invention. In these drawings, Fig. 1 is a top view of the instrument partly in cross-section, showing also the device for moving the reflective polarizers, and Fig. 2 represents perspectively, the essential parts of the apparatus. The direction of the incident rays of light are indicated in Figs. 1 and 2 by the arrows and broken lines. A tube or sleeve 3 is provided at its free end with the protective glass plate 1 and carries the Nicol prism 2. The tube 3 is rotatably placed on tube 4 which carries a second Nicol prism 5, whereby the prisms 2 and 5 may be relatively adjusted by the hand of the operator. Tube 4 is rotatably carried by the extension 6 of the housing 8, said extension enclosing the quartz plate 7. Tube 4 is furthermore provided with a milled ring 4" and a toothed rim 4' engaging with pinion 14 secured on shaft 15. This shaft 15 carries also, the pinion 13 engaging with the toothed rim 11' of sleeve 11. Sleeve 11 is attached to the extension 12 of the housing 8, said extension 12 being located at the eyepiece end of the housing 8. A quartz plate 18 is mounted in the extension 12. Sleeve 11 carries the polarization foil 21 and is provided with a handle 20, by means of which it may be turned through a 90 degree arc. This turning motion is imparted to the polarizer 5 by means of the shaft 15 with pinions 13 and 14 and the toothed rims 11' and 4'. The rotation of Nicol 2 can be read on scale 9 by means of pointer mark 10, while the rotation of Nicol 5 is indicated on scale 16 by means of pointer mark 17.

Housing 8 encloses the support 25 rotatably mounted on axis 24. Toothed rim 23 on said support engages into pinion 22 carried by the axis 22" which is provided in the housing 8. A milled knob 22' on said axis 22" allows turning of the pinion 22 and also of toothed rim 23 and support 25. Said support carries the moving device to which the reflective polarizers 26 and 27 are attached. Each of the polarizers 26 and 27 consists of a set of five glass plates of which set 26 is fixedly connected with support 25, while set 27 is pivotally held by two upper rods 28 and 28", and two lower rods 28' and 28''', said rods being pivotally fixed to the support 25. By this means the two sets of reflective polarizers 26 and 27 are kept in a position parallel to each other, said position being always maintained when moving support 25 by means of toothed rim 23 and pinion 22. The parallel movement of the second set of polarizers 27 with respect to the first set of polarizers 26 is controlled by the pin 29 fastened to the housing 8, said pin fitting with its upper part in slit 30 provided in rod 28'.

When using the instrument, the hue of the color is first adjusted by turning the milled ring 4", whereby Nicol 5 and at the same time sleeve 11 with polarization foil 21 are turned. To vary saturation of the color, it is necessary to change the position of the two reflective polarizers 26 and 27 with respect to each other and to the rays of light passing through quartz plate 7. This is done by turning the milled knob 22'. While thus adjusting hue and saturation, it is necessary to turn, at the same time, Nicol 2 in such a manner that proper brilliance of the color produced is maintained.

If the color sought has been found, its complementary color can be readily obtained by turning, through 90 degrees, the polarizers 5 and 21 relative to the glass plate polarizers 26 and 27 by means of the handle 20. It is of course, also possible to produce the complementary color by turning, through 90 degrees, the glass plates 26 and 27 relative to the polarizers 5 and 21.

If required, the apparatus may also be provided with means for allowing a comparative pencil of rays to pass through the same, as mentioned above. This device is not specifically shown in the drawings, but it corresponds to a known device as illustrated more in detail for instance, in Ann. Phys. (4) 39, 1912, 545–568.

I claim:

1. An instrument for producing light of a predetermined color of predetermined saturation, comprising at least two light polarizing systems arranged in series in the path of a light beam, each of said systems including at least two polarizers, of which one is a reflective polarizer consisting of at least two glass plates, the reflective planes of said glass plates being arranged parallel to and spaced from each other, and means for pivoting each of said glass plates around an axis which is normal to the incident light beam, whereby the angle of incidence may be varied, while maintaining the plates in parallel relationship; at least one optically anisotropic element interposed between said polarizers; and means for altering the relative position of said polarizers and said anisotropic element.

2. An instrument for producing a light of a predetermined color of predetermined saturation, comprising at least two polarizers in the path of a light beam, of which one is a reflective polarizer consisting of at least two glass plates; at least one optically anisotropic element interposed between said polarizers; a housing for said reflective polarizer; a rotatable support mounted in said housing for carrying one glass plate of said reflective polarizer, the axis of rotation of said support being normal to the incident light beam; and a plurality of parallel rods pivotably connected to said rotatable support and to said other glass plate of the reflective polarizer, said other glass plate being pivotable around an axis normal to the incident light beam and said glass plates and pivotable rods forming a parallelogram.

3. An instrument for producing light of a predetermined color of predetermined saturation comprising, in combination: at least two polarizers in the path of a light beam, of which one is a reflective polarizer consisting of at least two glass plates, the reflective planes of said reflective polarizer being arranged parallel to and spaced from each other, and means for pivoting each of said glass plates around an axis which is normal to the incident light beam, whereby the angle of incidence may be varied, while maintaining the plates in parallel relationship; at least one optically anisotropic element interposed between said polarizers; and means for altering the relative position of said polarizers and said anisotropic element.

4. An instrument for producing light of a predetermined color of predetermined saturation comprising, in combination: at least two polarizers in the path of a light beam, of which one is a reflective polarizer consisting of two sets of a plurality of glass plates each, the reflective planes of said reflective polarizer being arranged parallel to and spaced from each other, and means for pivoting each of said sets of glass plates around an axis which is normal to the incident light beam, whereby the angle of incidence may be varied, while maintaining the plates in parallel relationship; at least one optically anisotropic element interposed between said polarizers; and means for altering the relative position of said polarizers and said anisotropic element.

5. An instrument for producing light of a predetermined color of predetermined saturation, comprising three polarizers in the path of a light beam arranged in series, of which the middle polarizer is a reflective polarizer consisting of at least two glass plates, the reflective planes of said glass plates being arranged parallel to and spaced from each other, and means for pivoting each of said glass plates around an axis which is normal to the incident light beam, whereby the angle of incidence may be varied, while maintaining the plates in parallel relationship; at least two optically anisotropic elements interposed between respective ones of said polarizers; and means for altering the relative position of said polarizers and said anisotropic elements.

6. An instrument for producing light of predetermined color of predetermined saturation, comprising in the path of a light beam, arranged in series, a set of two rotatable polarizers; a quartz plate; a reflective polarizer consisting of at least two glass plates, the reflective planes of said glass plates being arranged parallel to and spaced from each other, and means for pivoting each of said glass plates around an axis which is normal to the incident light beam, whereby the angle of incidence may be varied, while maintaining the plates in parallel relationship; a second quartz plate; an analyzer; and means for altering the relative position of said polarizers and said quartz plates.

7. An instrument as defined in claim 6 comprising means for directing a comparative light beam into the field of vision.

8. An instrument as defined in claim 6 comprising means for moving the reflective polarizer 90° in relation to the other polarizers.

SIEGFRIED RÖSCH.

References Cited in the file of this patent

UNITED STATES PATENTS

| Number | Name | Date |
|---|---|---|
| 1,751,567 | Wadsworth | Mar. 25, 1930 |
| 1,858,702 | Chambers | May 17, 1932 |
| 1,885,642 | Strong | Nov. 1, 1932 |
| 2,527,593 | Stadler | Oct. 31, 1950 |

OTHER REFERENCES

Brewster text, Treatise on Optics, pages 214, 215, and 216, 1853.

Annalen Der Physik, vol. 39 (1912), 4th Series, Article by L. Arons, pgs. 545 through 551.